United States Patent
Buck et al.

(10) Patent No.: US 10,130,957 B2
(45) Date of Patent: Nov. 20, 2018

(54) STACKABLE DISC-SHAPED FLOW ELEMENT AND SEPARATION DEVICE

(71) Applicant: ElringKlinger AG, Dettingen (DE)

(72) Inventors: Simon Buck, Metzingen (DE); Stefan Dwenger, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 436 days.

(21) Appl. No.: 14/883,405

(22) Filed: Oct. 14, 2015

(65) Prior Publication Data

US 2016/0089680 A1 Mar. 31, 2016

Related U.S. Application Data

(63) Continuation of application No. PCT/EP2014/057210, filed on Apr. 9, 2014.

(30) Foreign Application Priority Data

Apr. 18, 2013 (DE) ........................ 10 2013 207 058

(51) Int. Cl.
 *B04B 1/04* (2006.01)
 *B04B 7/12* (2006.01)
 (Continued)

(52) U.S. Cl.
 CPC .................. *B04B 5/08* (2013.01); *B04B 1/04* (2013.01); *B04B 5/12* (2013.01); *B04B 7/12* (2013.01); *B04B 2005/125* (2013.01)

(58) Field of Classification Search
 CPC .... B04B 1/04; B04B 1/08; B04B 7/14; B04B 5/08; B04B 5/12; B04B 7/12;
 (Continued)

(56) References Cited

U.S. PATENT DOCUMENTS 3,276,587 A 10/1966 Himeno
3,409,521 A * 11/1968 Sharples .................. B23H 9/00
 205/652
(Continued)

FOREIGN PATENT DOCUMENTS

DE 349710 3/1922
DE 363851 11/1922
(Continued)

*Primary Examiner* — Charles Cooley
(74) *Attorney, Agent, or Firm* — Womble Bond Dickinson (US) LLP

(57) ABSTRACT

A flow element, for a separation device, of simple construction and stably connectable to similarly constructed flow elements, includes a disc-shaped base body including a first side and a second side opposite the first side, wherein the first and/or second side includes a plurality of channels through which, in the mounted condition of the flow element in the separation device, a fluid is guidable outwards from a central opening in the base body, which is arranged centrally in the disc-shaped base body, or from the outside towards the centrally arranged central opening, wherein the base body includes a plurality of receiving portions at least on the first side and a plurality of projections at least on the second side, wherein, in the mounted condition of the flow element, the projections are engageable with the receiving portions of a further, similarly constructed flow element that is placed on the flow element.

24 Claims, 5 Drawing Sheets

(51) Int. Cl.
  *B04B 5/08* (2006.01)
  *B04B 5/12* (2006.01)
(58) Field of Classification Search
  CPC ... B04B 2005/125; B04B 5/06; B01F 5/0604;
          B01F 5/067; B01F 5/0672
  USPC .............................................. 494/67–73, 64
  See application file for complete search history.

(56) References Cited

U.S. PATENT DOCUMENTS

| | | | | |
|---|---|---|---|---|
| 4,262,841 A * | 4/1981 | Berber | ...................... | B04B 7/14 494/66 |
| 8,549,890 B2 * | 10/2013 | Klintenstedt | ............. | B04B 7/14 494/68 |
| 8,562,503 B2 * | 10/2013 | Rudman | ................... | B04B 7/14 494/73 |
| 8,678,989 B2 * | 3/2014 | Rudman | ................... | B04B 1/08 494/73 |
| 9,670,808 B2 * | 6/2017 | Gorbach | ................... | B04B 5/12 |
| 2010/0180854 A1 | 7/2010 | Baumann et al. | | |
| 2011/0237417 A1 * | 9/2011 | Rudman | ................... | B04B 1/08 494/70 |
| 2016/0089680 A1 * | 3/2016 | Buck | ........................ | B04B 5/12 494/74 |

FOREIGN PATENT DOCUMENTS

| | | |
|---|---|---|
| DE | 102010048484 | 4/2012 |
| DE | 102012100438 | 7/2013 |
| DE | 102012104598 | 12/2013 |
| EP | 1772193 | 4/2007 |

\* cited by examiner

STACKABLE DISC-SHAPED FLOW ELEMENT AND SEPARATION DEVICE

CROSS-REFERENCE TO RELATED APPLICATIONS

This application is a continuation of international application number PCT/EP2014/057210 filed on Apr. 9, 2014, and claims the benefit of German application No. DE 10 2013 207 058.6 filed on Apr. 18, 2013, which are incorporated herein by reference in their entirety and for all purposes.

FIELD OF DISCLOSURE

The present invention relates to a flow element for a separation device, in particular for separating oil from a gas current that contains oil mist.

BACKGROUND

Flow elements for separation devices are known for example from DE 10 2010 048 484 A1.

SUMMARY OF THE INVENTION

The object of the present invention is to provide a flow element that is of simple construction and is stably connectable to further flow elements of the same construction.

This object is achieved according to the invention by a flow element for a separation device which includes a disc-shaped base body, wherein the base body includes a first side and a second side opposite the first side, wherein the first side and/or the second side includes a plurality of channels through which, in the mounted condition of the flow element in the separation device, a fluid is guidable outwards from a central opening in the base body, which is arranged centrally in the disc-shaped base body, or from the outside towards the centrally arranged central opening, wherein the base body includes a plurality of receiving portions at least on the first side and a plurality of projections at least on the second side, wherein, in the mounted condition of the flow element, the projections are engageable with the receiving portions of a further flow element that is placed on the flow element and is of substantially the same construction.

Because the flow element is provided with projections and receiving portions, it is possible for a plurality of such flow elements to be stacked on one another particularly simply and to be connected to one another reliably and stably.

It may be advantageous if the base body of the flow element includes on both sides a respective plurality of channels.

The projections and receiving portions preferably form tongue-and-groove connections, in particular for the positive locking, centering and/or self-securing connection of at least two flow elements in at least two spatial directions, in particular perpendicular to a center axis of the base body.

By means of the projections and the receiving portions, the at least two flow elements are connected or connectable to one another in particular in a manner preventing rotation in relation to one another.

The fluid is preferably guidable outwards from the central opening in the base body in the radial direction in relation to a center axis of the base body, or from the outside inwards towards the central opening. During this, the flow path of the fluid is preferably not a rectilinear path but rather a curved path.

The center axis of the base body is preferably an axis of rotation of the flow element in the mounted condition thereof on or in the separation device.

In one embodiment of the invention, it may be provided for the first side and the second side each to include a plurality of projections and a plurality of receiving portions.

It may be advantageous if the first side and the second side each include a plurality of projections and a plurality of receiving portions which are arranged such that a projection of the one side of the base body and a receiving portion of the other side of the base body are always arranged to succeed one another in a direction that runs parallel to a center axis of the flow element.

As a result of this, a plurality of flow elements of the same construction may be stacked on one another in a particularly simple manner in a direction that runs parallel to the center axis of the flow element.

It may be provided for the first side of the base body and/or the second side of the base body to include a succession of projections and receiving portions alternating in the radial direction.

The receiving portions are preferably arranged and/or constructed in channel bottoms of the channels.

In particular, it may be provided for the receiving portions to be grooves or recesses in the channel bottoms of the channels.

The projections and receiving portions are preferably constructed to be mutually complementary, at least in certain sections. As a result of this, a plurality of flow elements of the same construction may be positioned particularly exactly in relation to one another.

In one embodiment of the invention, it may be provided for the channels in the first and/or the second side that are present in the unmounted condition of the flow element to be divided, in particular bisected, in the mounted condition, in a direction of flow of the fluid in the channels, by means of separating walls between the channels of a further flow element.

The flow element is preferably constructed to be stackable such that a stack of flow elements is producible from a plurality of flow elements of the same construction.

In this context, the projections of the one flow element preferably engage or are engageable with the receiving portions of a further flow element.

In particular, it may be provided for the flow elements to be connected to one another in positively-locking manner and in a manner preventing rotation in relation to one another, in all radial directions relative to the center axis.

It may be favorable if the flow element is constructed to be stackable such that a stack of flow elements that is arranged coaxially in respect of a common center axis is producible from a plurality of flow elements of the same construction. In particular, all the stacked flow elements are arranged coaxially in respect of the common center axis.

The common center axis of the stack is in particular an axis of rotation of the stack in the assembled condition of a separation device.

It may be provided for the channels to be formed to be curved, in particular to have a profile in the shape of a circle involute.

The terms "circle involute" and "a profile in the shape of a circle involute" should in particular be understood to mean a planar geometric curve which has a circle as the evolute.

A circle involute is in particular a spiral with constant separation distance between turns.

A profile in the shape of a circle involute is in particular a profile whereof the shape corresponds at least approximately to a portion of a spiral in which the spacing between turns is constant.

The channels are in particular curved to run in the direction of flow and/or along the flow path of the fluid.

As an alternative or in addition to this, it may be provided for the projections to be constructed to be curved, in particular to have a profile in the shape of a circle involute.

In particular, the projections are curved to run in the direction of flow and/or along the flow path of the fluid.

Further, as an alternative or in addition to this, it may be provided for the receiving portions to be constructed to be curved, in particular to have a profile in the shape of a circle involute.

In particular, it may be provided for the grooves or recesses that form the receiving portions to have a curved profile, in particular a profile in the shape of a circle involute.

The whole flow element is preferably constructed in one piece.

In one embodiment of the invention, it is provided for the channels of the flow element to have a cross section, as seen perpendicular to a direction of flow of the fluid in the channels, which is substantially constant in the direction of flow.

The projections are preferably free ends of separating walls which separate the channels from one another in a direction that is oriented perpendicular to a direction of flow of the fluid in the channels.

The direction in which the channels are separated by means of the separating walls is preferably further perpendicular to the center axis of the flow element.

The flow element according to the invention is in particular suitable for use in a separation device.

The present invention therefore also relates to a separation device, in particular for separating a liquid, for example an oil mist, from a gas current.

The separation device according to the invention preferably has individual or a plurality of the features and/or advantages that were described in conjunction with the flow element according to the invention.

Preferably, the separation device includes a stack of a plurality of flow elements according to the invention, in particular a plurality of flow elements according to the invention of the same construction.

It may be advantageous if the separation device includes at least one end plate element which delimits the stack of flow elements in a direction running parallel to a center axis of the flow elements.

The at least one end plate element preferably includes a side which, in the mounted condition of the separation device, faces the stack of flow elements and has substantially the same shape as the side of a flow element adjoining the end plate element which is remote from the at least one end plate element.

It may be favorable if the separation device includes two end plate elements which delimit the stack of flow elements on both sides of the stack, in a direction running parallel to a center axis of the flow elements.

The separation device preferably includes a connection element by means of which the two end plate elements are connected to one another in the assembled condition and the flow elements are pressed against one another between the end plate elements.

Preferably, by means of the connection element it is possible to make and/or maintain positive engagement between the flow elements in the radial direction, as seen in respect of the center axis.

The connection element may be for example a screw connection.

It may be provided for the connection element to extend along the center axis of the flow elements, in particular along the common center axis.

As an alternative or in addition to this, it may be provided for the connection element to be formed by a housing of the separation device. Preferably, the end plate elements are pressed onto the flow elements by means of the housing. As a result, a separate element that extends through the central openings in the flow elements, in particular a shaft, may preferably be dispensed with.

By means of the central openings in the flow elements, a central channel in the separation device is preferably formed, which extends along a center axis.

The central channel is for example constructed to be substantially in the shape of a cylinder or hollow cylinder (in particular if a shaft is used).

As an alternative to this, it may be provided for the central channel to be constructed to be substantially in the shape of a cone.

The cone shape of the central channel may in particular result from a suitable construction and/or arrangement of the flow elements.

As an alternative or in addition to this, it may be provided for the stack of flow elements to be reworked in order to enable for example a cone shape of the central channel.

As a result of a central channel in the shape of a cone, it is possible in particular to optimize the flow impacting on the individual flow elements.

Further, the flow element according to the invention and/or the separation device according to the invention may have individual or a plurality of the features and/or advantages described below.

The flow element preferably has a tongue-and-groove connection formed by the projections and the receiving portions. As a result of this, the individual flow elements may be stacked particularly simply and reliably and at the same time be positioned securely in relation to one another, in particular being centered, and fixed in place.

By means of the flow element according to the invention, unbalances of mass are preferably avoided. As a result of this, there is preferably an improvement in the smoothness of rotation of the separation device, in particular of the stack of flow elements.

Preferably, it is provided for the component parts that rotate in the use condition of the separation device, in particular the stack of flow elements, the end plate elements and/or a drive shaft, to be brought into a condition ready for installation simply by being stacked and connected. Preferably, an additional and in particular subsequent balancing may be dispensed with.

The channels that are formed in the assembled condition of the separation device have in particular a rectangular cross section of for example approximately 5 mm by approximately 0.5 mm.

It may further be provided for the channels that are formed in the assembled condition of the separation device to have a cross section in the shape of a trapezium or parallelogram.

A separate element for positioning the flow elements in relation to one another may preferably be dispensed with.

The end plate elements preferably form covers for the flow elements, in particular for the stack of flow elements.

Further features and/or advantages of the invention form the subject matter of the description below and the illustration that is shown of exemplary embodiments.

BRIEF DESCRIPTION OF THE DRAWINGS

Like or functionally equivalent elements are provided with the same reference numerals in all the Figures.

DETAILED DESCRIPTION OF THE DRAWINGS

Figure 1:
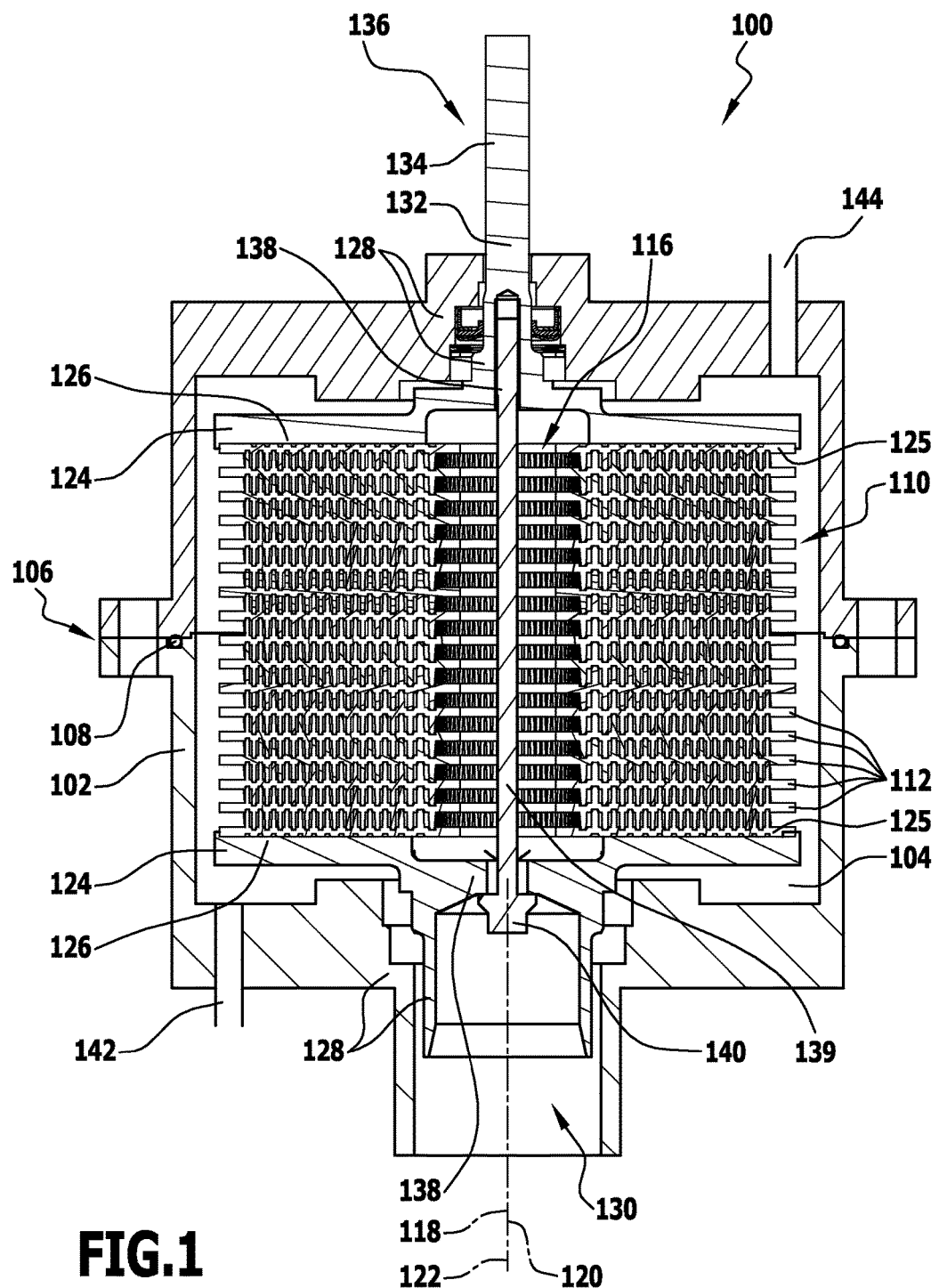
FIG. 1 shows a schematic sectional illustration of a first embodiment of a separation device, which includes a stack of flow elements of the same construction.

A separation device which is illustrated in FIGS. 1 to 4 and is designated 100 as a whole serves for example for separating off aerosol during a cutting machining operation in mechanical engineering, and/or for separating off oil mist from a gas flow.

The separation device 100 serves in particular for separating off oil mist from blow-by gases in an internal combustion engine.

The separation device 100 includes a housing 102 which surrounds an inner chamber 104 of the separation device 100.

The housing 102 is for example constructed in two parts, with the result that the inner chamber 104 is simple to access, in particular for mounting the separation device 100.

By means of a connection portion 106 and a (not illustrated) screw connection and/or weld connection, in particular by a friction welding method (for example a vibration, spin or ultrasonic welding method) or a hot gas welding method, the two parts of the housing 102 may be connected to one another, in particular for simple mounting of the separation device 100.

A seal 108 of the housing 102, which is arranged in the region of the connection portion 106, prevents the undesired exit of gas and/or liquid from the inner chamber 104 of the separation device 100 in the assembled condition of the separation device 100.

The inner chamber 104 of the separation device 100 is in particular constructed to be substantially cylindrical and serves for receiving a stack 110 of flow elements 112.

The flow elements 112 are constructed to be substantially disc-shaped and each have a central opening 114 which is for example circular.

By means of the central openings 114 in the flow elements 112, a central channel 116 is formed in the stack 110 of flow elements 112.

The central channel 116 is constructed to be substantially cylindrical and thus rotationally symmetrical about an axis of symmetry 118 which is a center axis 120 of the flow elements 112.

Figure 4:
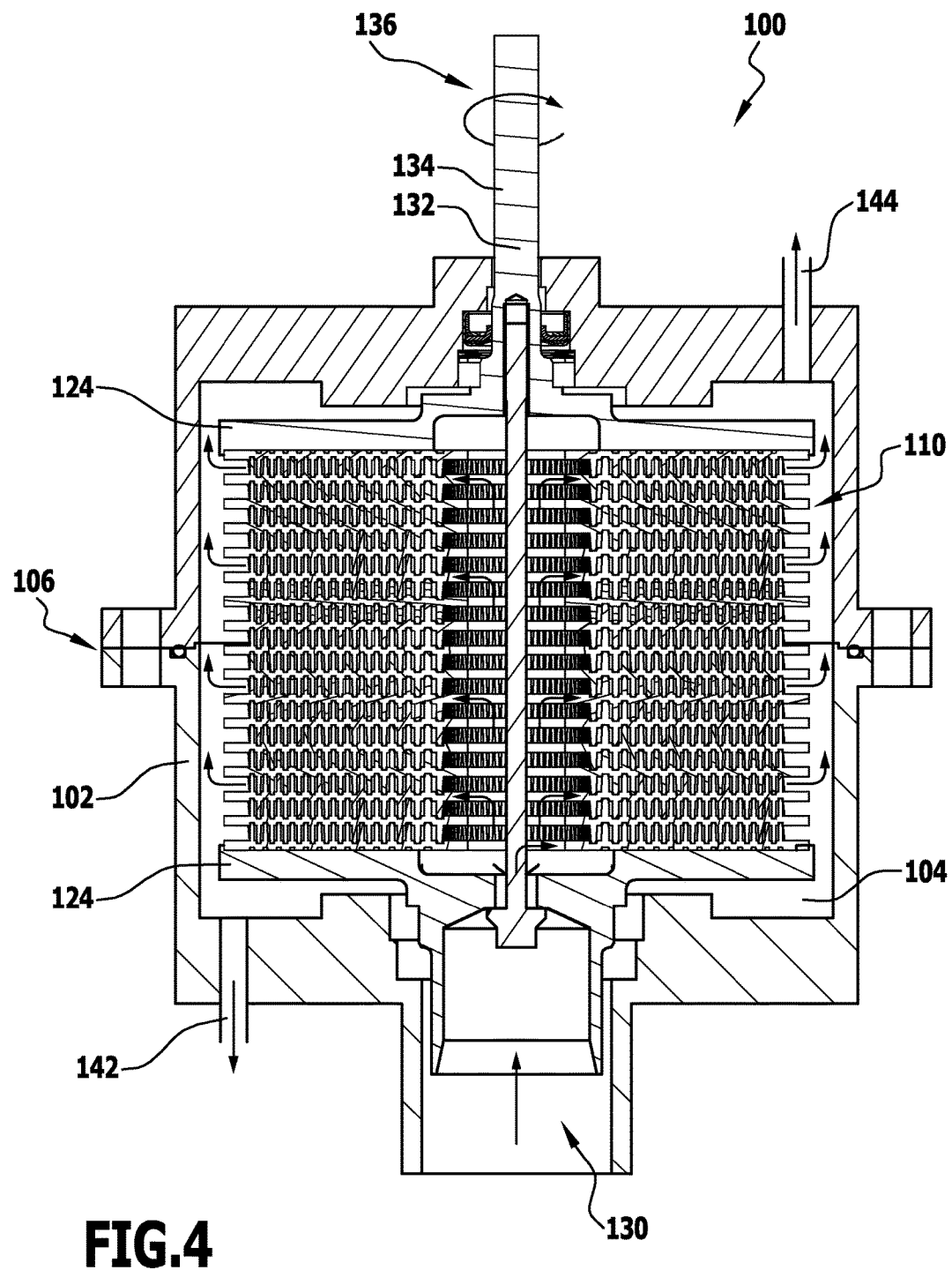
FIG. 4 shows a schematic cross section, corresponding to FIG. 1, through the separation device, for the purpose of illustrating the mode of functioning of the separation device.
Figure 5:
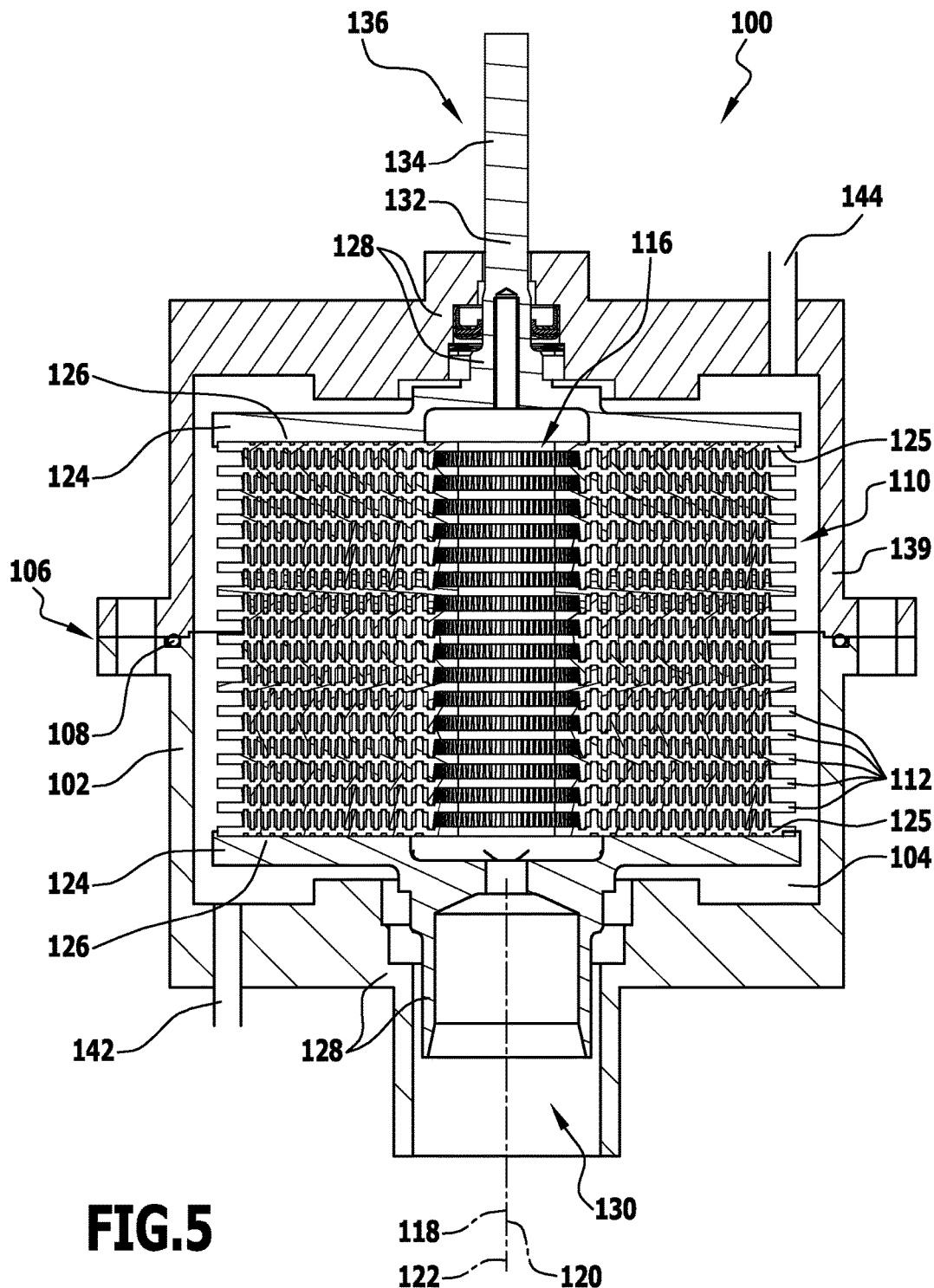
FIG. 5 shows a schematic illustration, corresponding to FIG. 1, of a second embodiment of a separation device, in which a shaftless connection is provided between the flow elements.

In the assembled condition of the separation device 100, illustrated in FIGS. 1 and 4, the stack 110 of flow elements 112 is rotatable about the center axis 120. The center axis 120 is thus an axis of rotation 122 of the flow elements 112, in particular of the stack 110 of flow elements 112.

In a direction running parallel to the center axis 120, the stack 110 of flow elements 112 is delimited on both sides by a respective end plate element 124. The end plate elements 124 each include an abutment portion 126, by means of which the end plate elements 124 abut against the flow elements 112, and a bearing portion 128, by means of which the end plate elements 124 are mounted rotatably on the housing 102.

One side 125 of each end plate element 124, facing the flow elements 112, has a shape corresponding to the shape of a side 150, 152 remote from the end plate element 124 of a flow element 112 adjoining the respective end plate element 124.

One of the end plate elements 124 is a component part of an inlet portion 130 of the separation device 100.

An aerosol for example may be fed through the inlet portion 130 to the inner chamber 104, in particular the central channel 116 of the stack 110 of flow elements 112.

The other one of the end plate elements 124 includes a drive portion 132, in particular a drive shaft 134, by means of which the end plate element 124 and thus also the stack 110 of flow elements 112 is couplable or coupled to a drive device 136.

By means of the drive device 136, and via the end plate element 124 having the drive portion 132, in particular a rotary movement can be transmitted to the stack 110 of flow elements 112.

In the embodiment of the separation device 100 illustrated in FIGS. 1 and 4, the end plate elements 124 moreover each include a connection portion 138 by means of which the end plate elements 124 are connectable through the central channel 116.

In this arrangement, it is in particular provided for a central connection element 139, for example a screw or threaded rod 140, to extend from the connection portion 138 of the one end plate element 124 to the connection portion 138 of the other end plate element 124 and to pull or press the end plate elements 124 towards one another. The flow elements 112 are thus clamped between the end plate elements 124.

The housing 102 of the separation device 100 includes a drainage opening 142 through which the fluid, in particular oil, that is separated off by means of the separation device 100 can be removed from the inner chamber 104, in particular being able to flow away.

Further, the housing 102 of the separation device 100 includes an outlet portion 144 through which the gas that has been cleaned by means of the separation device 100 can leave the inner chamber 104 of the separation device 100.

Figure 2:
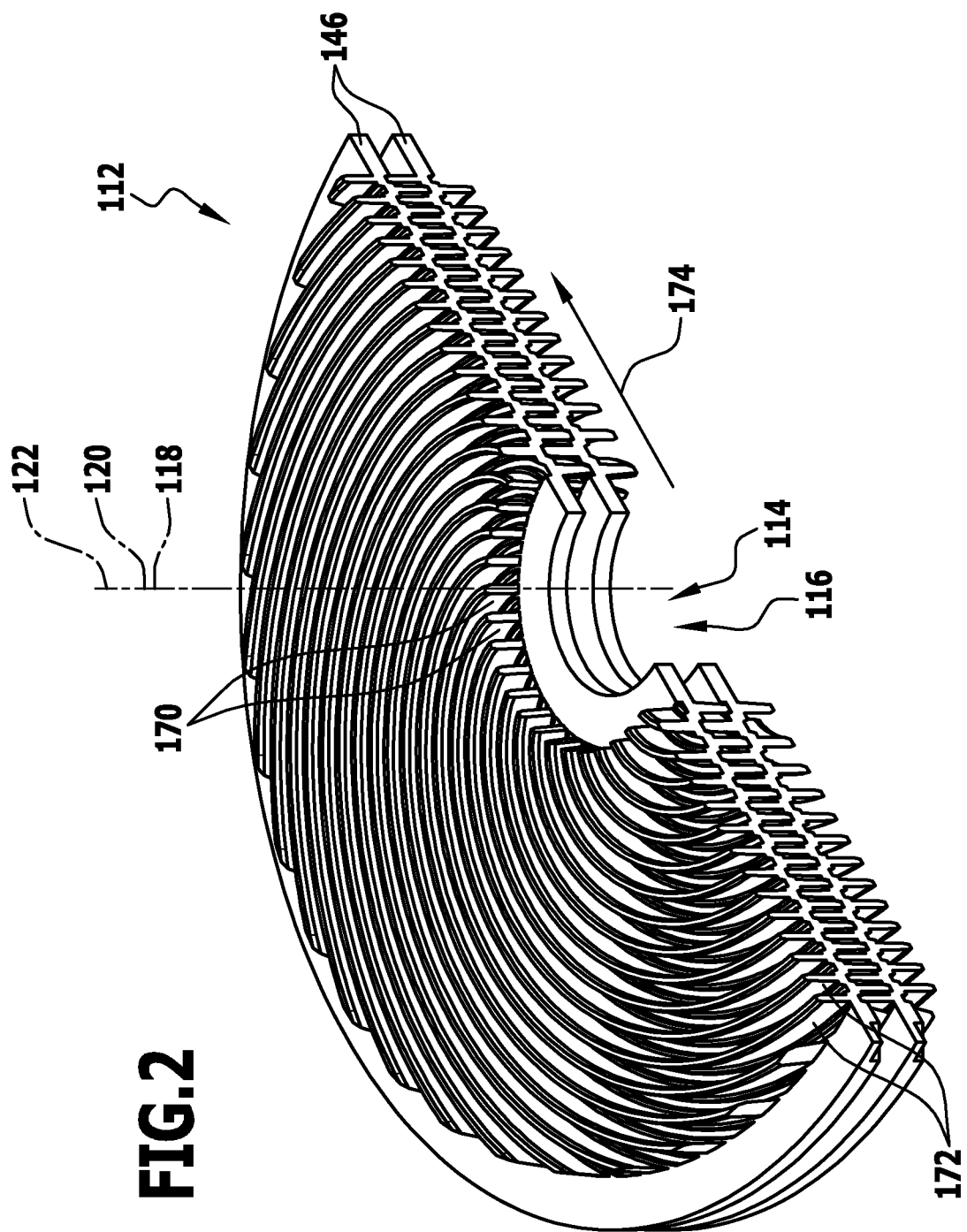
FIG. 2 shows a schematic, perspective, partly cut-away illustration of two flow elements of the separation device from FIG. 1.
Figure 3:
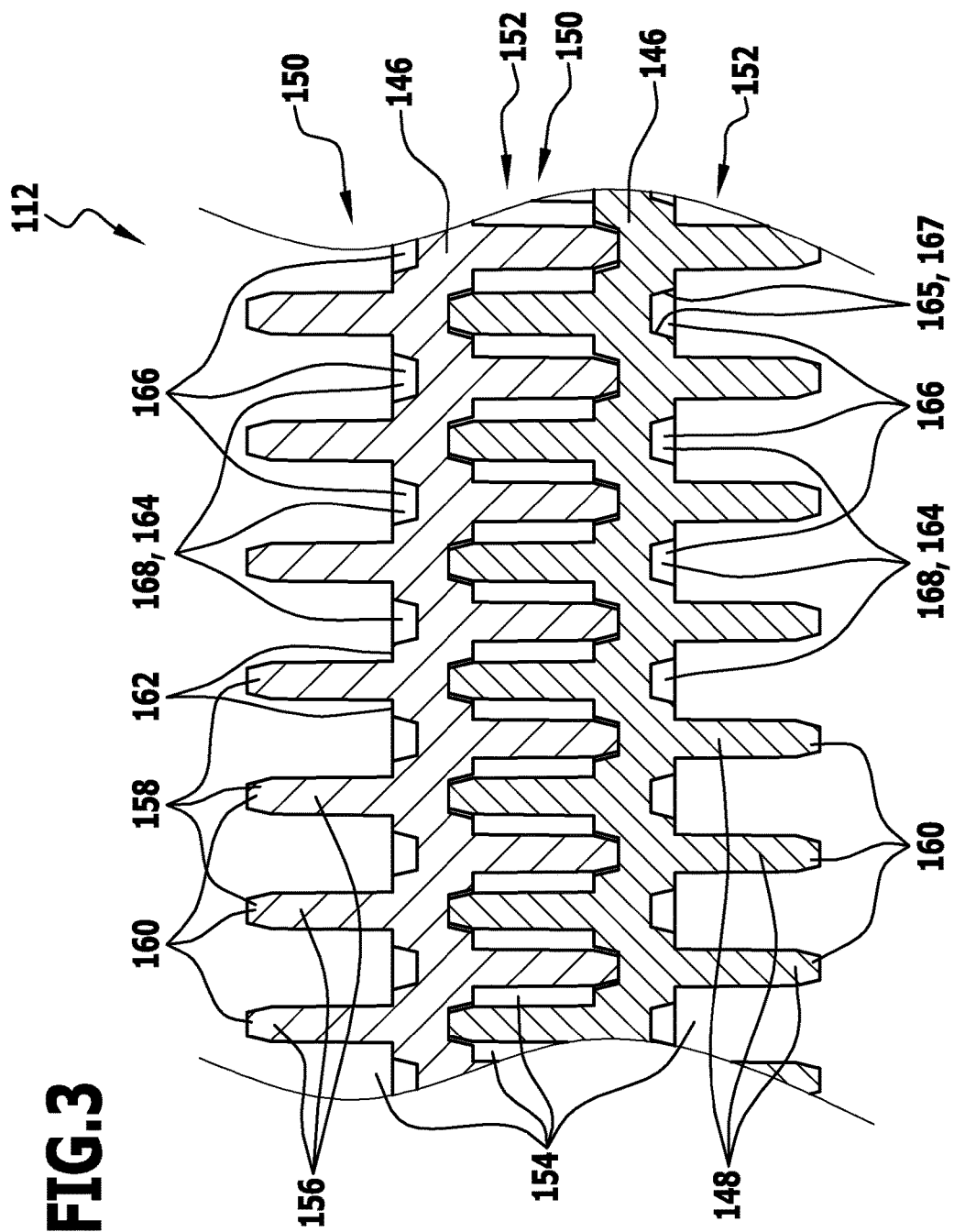
FIG. 3 shows a schematic cross section, on a larger scale, through the flow elements from FIG. 2.

As can be seen in particular from FIGS. 2 and 3, each flow element 112 includes a substantially disc-shaped base body 146 that is at least approximately rotationally symmetrical about the axis of rotation 122 and is provided with a multiplicity of walls 148 extending parallel to the center axis 120.

Both a first side 150 and a second side 152, which is opposite the first side 150, of the base body 146 is in this case provided with such walls 148.

Channels 154 of the flow elements 112 are formed by means of the walls 148.

The walls 148 are thus separating walls 156 between the channels 154.

Free ends 158 of the separating walls 156 that are remote from the base body 146 are constructed as projections 160.

The region of the base body 146 between the separating walls 156 is a channel bottom 162 of the channels 154.

The channel bottoms 162 are provided with recesses 164, for example grooves 166.

The recesses 164 or grooves 166 form receiving portions 168 for the projections 160.

The receiving portions 168, in particular the recesses 164 or grooves 166, are preferably constructed to taper in the direction of depth.

For this purpose, the receiving portions 168 preferably include exit slopes 165 or entry slopes 167 which are oriented obliquely in relation to the center axis 120.

The exit slopes 165 and entry slopes 167 are in particular formed by side walls of the receiving portions 168.

The projections 160 are preferably constructed to taper towards their end 158 remote from the base body 146, in particular being substantially complementary to the shape of the receiving portions 168.

As a result of the tapering construction of the receiving portions 168 and the projections 160, the flow elements 112 may be positioned particularly precisely in relation to one another and connected to one another stably and reliably.

Both the first side 150 and the second side 152 of the base body 146 is provided with projections 160 and receiving portions 168 of this kind.

The projections 160 and the receiving portions 168 are in this case arranged to be distributed such that if flow elements 112 of the same construction are simply stacked on one another the projections 160 on the first side 150 of a flow element 112 engage in the receiving portions 168 on the second side 152 of a further flow element 112. At the same time, the projections 160 on the second side 152 of the further flow element 112 preferably engage in the receiving portions 168 on the first side 150 of the first flow element 112.

The separating walls 156, the channels 154, the projections 160 and the receiving portions 168 have a profile that is substantially in the shape of a circle involute.

In this way, channels 154 that are in the shape of a circle involute and that extend from an inner end 170 facing the central opening 114 to an outer end 172 remote from the central opening 114 are formed.

By means of the channels 154, it is thus possible for the aerosol that is fed through the inlet portion 130 to be guided outwards from the central channel 116 in a direction 174 which is radial in relation to the center axis 120.

The separation device 100 described above functions as follows.

The stack 110 of flow elements 112 is set in rotation by means of the drive device 136, via the drive portion 132 of the end plate element 124.

The stack 110 of flow elements 112 thus functions as a centrifuge, by means of which heavy components, in particular droplets, of an aerosol can be separated off.

The aerosol, which is formed for example as a blow-by gas of an internal combustion engine, is guided via the inlet portion 130 of the separation device 100, through the end plate element 124 arranged facing the inlet portion 130, and fed to the central channel 116 of the stack 110 of flow elements 112.

The aerosol enters the channels 154 at the inner ends 170 of the channels 154 and is guided through the channels 154 in the radial direction 174 as far as the outer ends 172 of the channels 154. Because of the rotation and the shape of the channels 154, the droplets of aerosol are separated off at the separating walls 156. Finally, the droplets are accelerated in the radial direction 174, in the direction of the housing 102, and then fall to the bottom.

The liquid, in particular oil, that is separated in this way can be removed from the inner chamber 104 of the separation device 100 via the drainage opening 142.

The gas that is freed of oil leaves the inner chamber 104 via the outlet portion 144 of the housing 102 of the separation device 100.

By means of the described separation device 100, it is thus possible to clean in particular a gas current laden with droplets.

As an alternative to the mode of functioning described above, it may also be provided for an aerosol, for example, to flow through the separation device 100 in the opposite direction.

In that case, the aerosol flows into the inner chamber 104 at the portion of the housing 102 of the separation device 100 that is designated as the outlet portion 144. The aerosol then flows through the channels 154 in the opposite direction to the radial direction 174, from the outside inwards towards the central opening 114. During flow through the channels 154, relatively heavy components of the aerosol, in particular droplets, are separated off, with the result that a cleaned gas current can be removed from the inner chamber 104 of the housing 102 of the separation device 100 through the central channel 116 and the portion that is designated as the inlet portion 130.

With this mode of functioning of the separation device 100 too, the components of the aerosol that are separated off are removed from the inner chamber 104 of the housing 102 through the drainage opening 142.

A second embodiment of a separation device 100, illustrated in FIG. 5, differs from the first embodiment illustrated in FIGS. 1 to 4 substantially in that no threaded rod 140 is provided for connecting the end plate elements 124.

In the embodiment of the separation device 100 that is illustrated in FIG. 5, the housing 102, preferably exclusively, serves to press the end plate elements 124 against the stack 110 of flow elements 112 and thus to prevent an undesired relative movement of the end plate elements 124 and/or the flow elements 112 in relation to one another.

In particular for this purpose the bearing portions 128 of the housing 102, against which the bearing portions 128 of the end plate elements 124 abut in the assembled condition of the separation device 100, are constructed such that by connecting the two parts of the housing 102 at the connection portion 106 it is also possible to fix the end plate elements 124 and the flow elements 112 in place in the desired position relative to one another, and for them no longer to be capable of being moved relative to one another, in particular along the center axis 120.

Thus, the housing 102 forms the connection element 139 for connecting the end plate elements 124 to one another.

Otherwise, the second embodiment of the separation device 100, illustrated in FIG. 5, matches the first embodiment, illustrated in FIGS. 1 to 4, in terms of structure and function, so reference is made to the description above thereof in this respect.

Because, in all the embodiments described, a plurality of flow elements 112 of the same construction are provided with projections 160 and receiving portions 168, the stack 110 of flow elements 112 can be constructed particularly simply, and at the same time a reliable connection, in particular a self-securing connection preventing rotation in relation to one another, can be made between the flow elements 112.

The invention claimed is:

1. A flow element for a separation device, including a disc-shaped base body which includes a first side and a second side opposite the first side,
wherein the first side and/or the second side includes a plurality of channels through which, in a mounted condition of the flow element in the separation device, a fluid is guidable outwards from a central opening in the base body, which is arranged centrally in the disc-shaped base body, or from the outside towards the centrally arranged central opening,
wherein the base body includes a plurality of receiving portions at least on the first side and a plurality of projections at least on the second side,
wherein, in the mounted condition of the flow element, the projections are engageable with the receiving portions of a further flow element that is placed on the flow element and is of substantially the same construction,
wherein the first side and the second side each include a plurality of projections and a plurality of receiving portions.

2. The flow element according to claim 1, wherein the first side and the second side each include a plurality of projections and a plurality of receiving portions which are arranged such that a projection of the one side of the base body and a receiving portion of the other side of the base body are always arranged to succeed one another in a direction that runs parallel to a center axis of the flow element.

3. The flow element according to claim 1, wherein the first side of the base body and/or the second side of the base body includes a succession of projections and receiving portions alternating in the radial direction.

4. The flow element according to claim 1, wherein the receiving portions are arranged in channel bottoms of the channels.

5. The flow element according to claim 1, wherein the projections and receiving portions are constructed to be mutually complementary.

6. The flow element according to claim 1, wherein the channels in the first side and/or the second side that are present in an unmounted condition of the flow element are divided, in the mounted condition, along a direction of flow of the fluid in the channels, by means of separating walls between the channels of a further flow element.

7. The flow element according to claim 1, wherein the flow element is constructed to be stackable, such that a stack of flow elements is producible from a plurality of flow elements of the same construction, and the projections therein of the one flow element engage with the receiving portions of a further flow element.

8. The flow element according to claim 1, wherein the flow element is constructed to be stackable such that a stack of flow elements that is arranged coaxially in respect of a common center axis is producible from a plurality of flow elements of the same construction.

9. The flow element according to claim 1, wherein the channels are constructed to be curved.

10. The flow element according to claim 1, wherein the projections are constructed to be curved.

11. The flow element according to claim 1, wherein the receiving portions are constructed to be curved.

12. The flow element according to claim 1, wherein the whole flow element is constructed in one piece.

13. The flow element according to claim 1, wherein the channels of the flow element have a cross section, as seen perpendicular to a direction of flow of the fluid in the channels, which is substantially constant in the direction of flow.

14. The flow element according to claim 1, wherein the projections are free ends of separating walls which separate the channels from one another in a direction that is oriented perpendicular to a direction of flow of the fluid in the channels.

15. The separation device including a stack of a plurality of flow elements according to claim 1.

16. The separation device according to claim 15, wherein the separation device includes at least one end plate element which delimits the stack of flow elements in a direction running parallel to a center axis of the flow elements.

17. The separation device according to claim 16, wherein the at least one end plate element includes a side which, in the mounted condition of the separation device, faces the stack of flow elements and has substantially the same shape as the side of a flow element adjoining the end plate element which is remote from the at least one end plate element.

18. The separation device according to claim 15, wherein the separation device includes two end plate elements which delimit the stack of flow elements on both sides of the stack, in a direction running parallel to a center axis of the flow elements.

19. The separation device according to claim 18, wherein the separation device includes a connection element by means of which the two end plate elements are connected to one another and the flow elements are pressed against one another between the end plate elements.

20. The separation device according to claim 19, wherein the connection element extends along the center axis.

21. The separation device according to claim 19, wherein the connection element is formed by a housing of the separation device.

22. The separation device according to claim 15, wherein by means of the central openings in the flow elements, a central channel in the separation device is formed, which extends along a center axis.

23. The separation device according to claim 22, wherein the central channel is constructed to be substantially in the shape of a cylinder, hollow cylinder or cone.

24. A flow element for a separation device, including a disc-shaped base body which includes a first side and a second side opposite the first side,
wherein the first side and/or the second side includes a plurality of channels through which, in a mounted condition of the flow element in the separation device, a fluid is guidable outwards from a central opening in the base body, which is arranged centrally in the disc-shaped base body, or from the outside towards the centrally arranged central opening,
wherein the base body includes a plurality of receiving portions at least on the first side and a plurality of projections at least on the second side,
wherein, in the mounted condition of the flow element, the projections are engageable with the receiving portions of a further flow element that is placed on the flow element and is of substantially the same construction,
wherein the channels in the first side and/or the second side that are present in an unmounted condition of the flow element are divided, in the mounted condition, along a direction of flow of the fluid in the channels, by means of separating walls between the channels of a further flow element.

* * * * *